(12) United States Patent
Benkreira et al.

(10) Patent No.: US 10,481,783 B1
(45) Date of Patent: Nov. 19, 2019

(54) DYNAMIC CREDIT REPORT OBFUSCATION

(71) Applicant: Capital One Services, LLC, McLean, VA (US)

(72) Inventors: Abdelkader M'Hamed Benkreira, Washington, DC (US); Joshua Edwards, Philadelphia, PA (US); William F. Carroll, II, Huntingtown, MD (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/166,389

(22) Filed: Oct. 22, 2018

(51) Int. Cl.
| | | |
|---|---|---|
| *G06F 3/0484* | (2013.01) | |
| *G06F 3/0482* | (2013.01) | |
| *G06F 17/24* | (2006.01) | |
| *G06F 16/43* | (2019.01) | |
| *G06F 16/435* | (2019.01) | |
| *G06Q 40/02* | (2012.01) | |
| *H04N 1/44* | (2006.01) | |
| *H04L 29/08* | (2006.01) | |
| *H04L 12/58* | (2006.01) | |

(52) U.S. Cl.
CPC ........ *G06F 3/04847* (2013.01); *G06F 3/0482* (2013.01); *G06F 17/243* (2013.01); *G06Q 40/025* (2013.01); *H04L 67/306* (2013.01); *H04N 1/4446* (2013.01); *G06F 3/04842* (2013.01); *G06F 16/43* (2019.01); *G06F 16/435* (2019.01); *H04L 51/00* (2013.01); *H04L 51/08* (2013.01); *H04L 67/20* (2013.01)

(58) Field of Classification Search
CPC .... G06F 3/0482; G06F 3/04842; G06F 16/43; G06F 16/435; G06F 3/04847; G06F 17/243; H04L 51/08; H04L 51/00; H04L 67/306; H04L 67/20; G06Q 40/025; H04N 1/4446
See application file for complete search history.

(56) References Cited

U.S. PATENT DOCUMENTS

| 6,609,200 B2 | 8/2003 | Anderson et al. | |
|---|---|---|---|
| 2003/0177042 A1* | 9/2003 | Leon | G06Q 10/10 705/3 |
| 2004/0044681 A1* | 3/2004 | Brady | G06Q 10/109 |

(Continued)

*Primary Examiner* — Ting Z Lee
(74) *Attorney, Agent, or Firm* — DLA Piper LLP (US)

(57) ABSTRACT

A method for creating a customized and redacted credit report may include transmitting a user request to generate a customized credit report, receiving a copy of a stored credit report, analyzing the copy of the stored credit report, displaying one or more information fields and one or more selectable user interface elements, transmitting a credit report redaction list, and receiving a customized credit report. A user device for configuring a customized credit report may include a processor, a display in communication with the processor, and a non-transitory memory storing instructions that, when executed by the processor, cause the processor to perform processing including transmitting a user request to generate a customized credit report, displaying one or more information fields and one or more selectable user interface elements, transmitting a credit report redaction list, and receiving a shareable credit report link associated with a customized credit report.

19 Claims, 9 Drawing Sheets

(56) References Cited

U.S. PATENT DOCUMENTS

| | | | |
|---|---|---|---|
| 2011/0119576 A1* | 5/2011 | Aumann | G06F 17/2282 |
| | | | 715/255 |
| 2013/0139229 A1* | 5/2013 | Fried | H04L 63/08 |
| | | | 726/5 |
| 2014/0156503 A1* | 6/2014 | Lassen | G06Q 40/025 |
| | | | 705/38 |

* cited by examiner

US 10,481,783 B1

DYNAMIC CREDIT REPORT OBFUSCATION

TECHNICAL FIELD

The present disclosure relates generally to methods and systems for dynamically obfuscating aspects of an electronic credit report for creating a customized credit report that may be made electronically accessible to a third party.

BACKGROUND

A credit report is a statement that includes information about a credit activity of an individual, and may include current credit information, such as a home mortgage payment history, a car or personal loan payment history, a credit card payment history, and status information for open and closed accounts associated with the individual. Such statements often include personal information, such as an individual's current name, any names used in the past, current and former addresses, a birth date, a social security number, and phone numbers, including current and past phone numbers, as well as credit account information, collection information, as well as other public record information, such as liens, foreclosures, bankruptcies, and civil suits and judgments.

Credit reports are useful for potential lenders and other parties to obtain more information regarding an individual that may be used for example to determine whether a loan should be given to a user, or whether the individual has a history indicating that they are unlikely to make payments for a car, a home, an apartment, or other item generally involving a contractual agreement.

In some situations, for example when a user is applying for an apartment or a condominium, the prospective landlord may request a credit report from the applying individual. In most instances, the landlord does not require all information in a credit report in order to determine whether the individual is qualified for purposes of approving or denying the application for the residence. But currently an applying individual has limited abilities to limit the scope of information included in the credit report, or to redact information that is not necessary for the purpose for which the credit report is sought, such that the landlord may make a determination on an individual's application by relying on information that is not necessary or relevant to the individual's application, yet is harmful to the individual's application and may result in a denial of the application.

As an example, if an individual applies to lease an apartment, a landlord may require that the applicant submit a copy of a credit report. If the applicant submits a copy of the individual's credit report, then all information included with the report is accessible by the landlord, even though the landlord may only require certain information included with the report, for example the applicant's prior addresses and a credit score. The applicant may redact information on a hard copy of the individual's credit report, or create a custom copy of the credit report, but the landlord is receiving the information from the individual, and the credit report copy may not have indicia of trustworthiness, authenticity, and reliability that may be provided if the lender obtains a copy from a third party. As another example, a prospective employer may desire a copy of an applicant's credit report, but an individual may be concerned about disclosing information not relevant to the employer's inquiry, such as an auto loan amount or mortgage amount, that are not related to job performance and the ability of the individual to complete tasks relevant to the potential employment.

SUMMARY OF THE DISCLOSURE

Systems and methods described herein may provide for dynamically obfuscating a credit report.

For example, a user device for configuring a customized and redacted credit report may include a processor, a display in communication with the processor, a wireless transceiver in communication with the processor, and a non-transitory memory storing instructions as part of a credit report functionality of an application on the user device that, when executed by the processor, cause the processor to perform processing including transmitting a user request to generate a customized credit report, displaying one or more information fields and one or more selectable user interface elements, transmitting a credit report redaction list including one or more of the one or more information fields to be redacted based on a selection of the one or more user interface elements, and receiving a shareable credit report link associated with a customized credit report including one or more redacted information fields based on the credit report redaction list.

In some embodiments, the processing further may further cause the processor to display a selectable shareable link option, select the selectable shareable link option, and transmit a user share request including at least the user identifier and a third party address.

In some embodiments, the processing further may further cause the processor to transmit an additional user request to generate an additional customized credit report, and receive an expiration notice including a message indicating the shareable credit report link has expired.

In some embodiments, the processing further may further cause the processor to transmit an additional user request to generate a new customized credit report, display one or more additional information fields and one or more additional selectable user interface elements, transmit an additional credit report redaction list including one or more of the one or more additional information fields to be redacted, and receive an additional customized credit report and an additional credit report link.

In some embodiments, the processing further may further cause the processor to display a selectable shareable link option and a mail link option, receive a selection indication indicating the selection of the mail link option, pre-populate a message, the message including at least the credit report link and a third party address.

As another example, a method for creating a customized and redacted credit report may include logging into a credit report application on a user device, transmitting, by the user device, a user request to generate a customized credit report, receiving, by the user device, a copy of a stored credit report, analyzing the copy of the stored credit report including identifying one or more information fields including information associated with the user profile, displaying, by the user device, one or more information fields and one or more selectable user interface elements associated with the one or more information fields, transmitting, by the user device, a credit report redaction list including one or more of the one or more information fields to be redacted based on a selection of the one or more user interface elements, receiving, by the user device, a customized credit report including one or more redacted information fields.

In some embodiments, the method may further include displaying, by the user device, a selectable shareable link option, selecting the selectable shareable link option, and transmitting, by the user device, a user share request including at least the user identifier and a third party address.

In some embodiments, the method may further include transmitting, by the user device, an additional user request to generate an additional customized credit report including at least the user identifier, and receiving, by the user device, an expiration notice including a message indicating that the copy of the stored credit report has expired.

In some embodiments, the method may further include transmitting, by the user device, an additional user request to generate an additional customized credit report including at least the user identifier, receiving, by the user device, an additional copy of a stored credit report, displaying, by the user device, one or more additional information fields and one or more additional selectable user interface elements, transmitting, by the user device, an additional credit report redaction list including one or more of the one or more additional information fields to be redacted, and receiving, by the user device, an additional customized credit report including one or more additional redacted information fields accessible via an additional sharable credit report link for enabling third party access to the additional customized credit report.

In some embodiments, the method may further include displaying, by the user device, a selectable shareable link option and a mail link option, receiving a selection of the mail link option, and pre-populating, by the user device, a message including at least the sharable credit report link and a third party address.

As another example, a method for creating a customized and redacted credit report may include receiving, by a credit report server, a user request to generate a customized credit report including at least a user identifier, identifying a user profile based on the user identifier, accessing a credit report associated with the user profile, transmitting, by the credit report server, the credit report to a user device associated with the user identifier including one or more information fields, receiving, by the credit report server, a credit report redaction list including one or more information fields to be redacted based on a user selection made via a remote user device, generating the customized credit report including one or more redacted information fields based on the credit report redaction list and the accessed credit report, storing the customized credit report, generating a customized credit report link associated with the customized credit report, and transmitting, by the credit report server, the customized credit report and the customized credit report link to the user device.

In some embodiments, the method may further include receiving, by the credit report server, a user share request including at least the user identifier and a third party address, generating a third party message including the customized credit report link and the third party address, and transmitting the third party message to a third party.

In some embodiments, the method may further include, in response to transmitting the third party message to the third party, receiving an open indication indicating the third party has viewed the third party message, and send a read notice to the user device indicating that the third party has viewed the third party message.

In some embodiments, the method may further include receiving, by the credit report server, an additional user request to generate a customized credit report including at least the user identifier, identifying the user profile based on the user identifier, and comparing a creation date of the accessed credit report to a credit report time threshold.

In some embodiments, the method may further include, based on comparing the accessed credit report creation date and the credit report time threshold, transmitting an expiration notice to the user including a message indicating that the accessed credit report has expired.

In some embodiments, the method may further include, based on comparing the accessed credit report creation date and the credit report time threshold, receiving an updated credit report associated with the user profile, transmitting, by the credit report server, the updated credit report to the user including the one or more information fields, receiving, by the credit report server, an additional credit report redaction list including one or more additional information fields to be redacted, generating an additional customized credit report including one or more additional redacted information fields, storing the additional customized credit report, generating an additional customized credit report link associated with the additional customized credit report, and transmitting, by the credit report server, the additional customized credit report and the additional customized credit report link to the user device.

In some embodiments, the method may further include transmitting, by the credit report server, an updated credit report request to a credit agency including user information associated with the user profile.

In some embodiments, the method may further include receiving, by the credit report server, a current credit report associated with the user, and storing the current credit report.

In some embodiments, the method may further include comparing, by the credit report server, the stored current credit report with a stored credit report template, and updating the stored credit report template based on comparing the stored current credit report to the stored credit report template.

In some embodiments, the method may further include deleting the accessed credit report, and transmitting a notice to the user device, the notice indicating that the stored current credit report has been processed and is available to use.

DETAILED DESCRIPTION OF SEVERAL EMBODIMENTS

Figure 1:
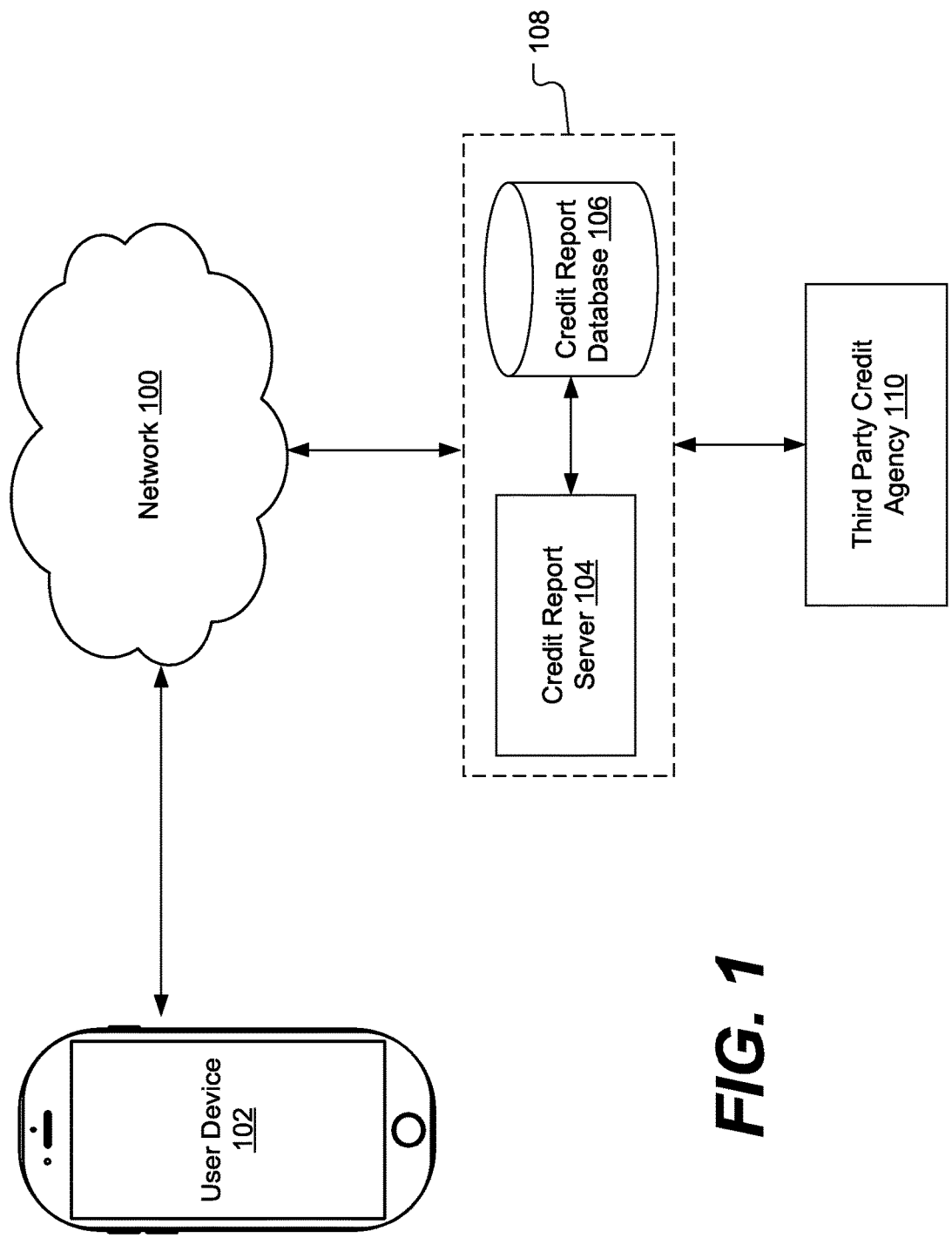
FIG. 1 shows a block diagram structure including a user device, a credit report server, and a third party credit agency according to an embodiment of the present disclosure.

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

The present disclosure provides for including, omitting, and redacting information from a credit report that otherwise would be included in a credit report requested by a third party, for example a prospective landlord, employer, or lender. A third party may request a copy of a credit report associated with an individual through a credit report server, as discussed in the present disclosure. Prior to sending the request, the third party may indicate information that is requested, preferred, or needed in order to fully consider the individual's application.

The individual may review the request, and determine information that may be included, excluded, or redacted from the customized credit report. Once the individual has identified information to include, omit, or redact from the customized credit report, the credit report server may generate a customized credit report and transmit a custom URL to the individual, and in some embodiments the credit report server may send a copy of the customized credit report that the individual may send to the third party. The custom URL may point to a website associated with the customized credit report, such that if the third party selects the custom URL, the third party may be directed to a website where the third party can access an individual's customized credit report.

If the third party requires additional information, then the third party may submit a request to the credit report server that may include the requested information. In such a manner, the individual can review the request, and if agreeable, update the credit report (or alternatively cause a new credit report to be created) that may be made accessible to the third party.

The credit report server may create and maintain templates that may be used for purposes of generating a customized credit report. The templates may be based on a credit report received from a credit agency. If a credit report server receives a new credit report from a credit agency, for example when a user is attempting to use the service for the first time, the credit report server may compare the credit report associated with a credit agency to a template used to create customized credit reports based on credit reports received from the credit agency. In such a manner, the credit report server may be able to update its template if the credit agency updates or changes the presentation of information in a credit report.

Turning now to the figures, FIG. 1 shows a block diagram of an environment including a mobile device (or user device), a credit report server, and a third party credit agency according to an embodiment of the present disclosure. FIG. 1 shows a user device 102 and a credit report system 108, including credit report server 104 and credit report database 106, in communication with network 100. Third party credit agency 110 is in communication with credit report system 108, and in some embodiments third party credit agency 110 may be in communication with credit report system 108 through network 100.

A third party credit agency 110 may be used to obtain a credit report associated with a user of user device 102, or to obtain a credit report template that may be used to generate customized credit reports. In some embodiments, credit report database 106 stores credit report templates, copies of credit reports obtained by third party credit agency 110, and customized credit reports generated by credit report server 104. Credit report database 106 may also store information relating to stored customized credit reports, for example, metrics relating to who has viewed a customized credit report and the total number of times a customized credit report has been viewed.

The credit report system 108 shown in FIG. 1 may be offered by a standalone third party, for example a financial services provider desiring to provide credit report related services to its customers and potential customers, or the credit report system 108 may be a service provided directly by the third party credit agency (not shown). For embodiments where a third party credit agency offers the services accessible through credit report system 108, the third party credit agency may provide an application programming interfaces (API) to third parties in order to access credit report services that it offers, including an API for third parties to access an obfuscation credit report service as described in the present disclosure. For embodiments where the standalone third party, e.g. a financial services provider, provides services associated with credit report system 108, the standalone third party can offer obfuscation credit report services as described in the present disclosure to its customers. Because the standalone party is likely a trusted service provider, for example because it safely and securely provides financial services to its customers and maintains a strong reputation in financial sectors, it may provide an indicia of trustworthiness and reliability to users of credit report system 108. Such users, by creating or receiving a customized credit report, can trust that a customized credit report is legit and it has not been improperly tampered with or otherwise modified to mislead a party intending to rely upon such a credit report.

User device 102 may be an electronic device, for example a smartphone, a personal computer, a tablet, or other electronic device capable of communicating with a network, such as network 100. User device 102 may communicate with credit report system 108 to transmit a request to create a customized credit report, receive information relating to the request, and confirm to credit report system 108 that customized credit report may be sent to an intended recipient. The user device 102 may include a memory interface, one or more data processors, image processors, and/or central processing units (CPU), and a peripherals interface. The memory interface, the one or more processors, and/or the peripherals interface may be separate components, or may be integrated in one or more integrated circuits. The various components in the user device 102 may be coupled by one or more communication buses or signal lines.

Sensors and other devices may be coupled to a peripherals interface found in user device 102, and user device 102 may include a camera and optical sensor for capturing images. Sensors and other devices may be used to authenticate a user for purposes of accessing a customized credit report containing sensitive information. The optical sensor may be used to collect images of a user to be used during authentication of a user, for example facial recognition analysis.

For communications, user device 102 may include communications systems for communicating with other devices over wired and wireless communication paths. For example, user device 102 may include radio frequency receivers and transmitters and/or optical receivers and transmitters for communicating using wired and wireless protocols. The specific design and implementation of communication systems may depend on the communication network(s) over which the user device 102 is intended to operate. For example, the user device 102 may include communication systems designed to operate over a GSM network, a GPRS network, an EDGE network, a Wi-Fi or WiMAX network, and a Bluetooth network.

User device 102 may include other systems for providing additional functionality. For example, user device 102 may include an audio system and an I/O system. An audio system may be coupled to a speaker and a microphone to facilitate voice-enabled functions, such as speaker recognition, voice replication, digital recording, and telephony functions. The I/O system may include a touch-surface controller coupled to a touch surface. The touch surface and touch-surface controller may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface.

The memory interface may be coupled to memory. Memory may include high-speed random access memory and/or non-volatile memory, such as one or more magnetic disk storage devices, one or more optical storage devices, and/or flash memory. The memory may store an operating system, and the operating system may include instructions for handling basic system services and for performing hardware dependent tasks.

Figure 2:
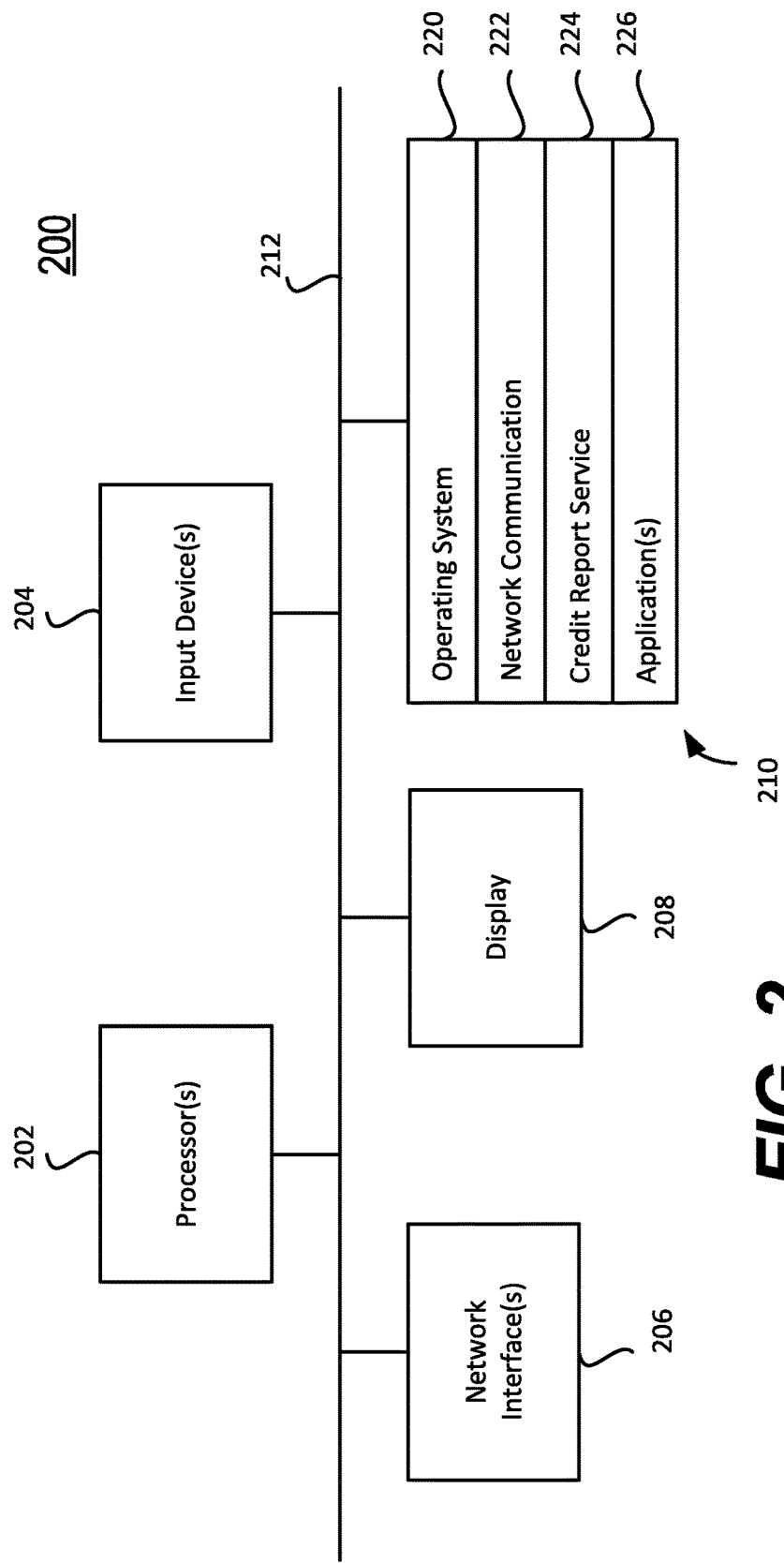
FIG. 2 shows a block diagram structure of a credit report server according to an embodiment of the present disclosure.

FIG. 2 is a block diagram of an example server device 200 that may implement various features and processes as described in the present disclosure. Server device 200 may be implemented on any electronic device that runs software applications derived from compiled instructions, including without limitation personal computers, servers, smartphones, and other electronic devices, and may be similar or identical in design and function to credit card server 104. In some implementations, server device 200 may include one or more processors 202, one or more input devices 204, one or more network interfaces 206, one or more display devices 208, and one or more computer-readable mediums 210. Each of these components may be coupled by a bus 212. While server device 200 is shown as a separate device from user device 102, various elements shown in FIG. 2, for example operating system 314, network communications 316, dynamic design service 318, and application(s) 320, can all run on user device 102, including the device shown in FIG. 2.

Processor(s) 202 may include any known processor technology, including but not limited to graphics processors and multi-core processors. Input device 304 may include any known input device technology, including but not limited to a keyboard, virtual keyboard, mouse, track ball, and touch-sensitive device. Display device 208 may include any known display technology, including but not limited to display devices using Liquid Crystal Display (LCD) or Light Emitting Diode (LED) technologies. Bus 212 may be any known internal or external bus technology used for exchanging communications, for example ISA, EISA, PCI, PCI Express, NuBus, USB, Serial ATA, FireWire, HyperTransport, and InfiniBand. Computer-readable medium 210 may include any medium that provides instructions to processor(s) 202 for execution, including for example non-volatile storage media, such as optical disks, magnetic disks, and flash drives, or volatile media, such as SDRAM and RAM.

Computer-readable medium 210 may include various software instructions, including an operating system software 220, network communication software 222, credit report service 224, and applications 226. Operating system software 220 may include known operating systems, such as macOS, Windows, or Linux. The operating system may perform basic tasks, including but not limited to recognizing input from input device(s) 204, sending output to display device 208, managing files and directories on computer-readable medium 210, controlling peripheral devices, for example disk drives and printers, that can be controlled directly or through an I/O controller, and managing traffic on bus 212. Network communications software 222 may establish and maintain network connections, for example implementing communication protocols, such as TCP/IP, HTTP, Ethernet, and telephony, and be used to communicate information through network interface(s) 206. Application software 226 may include one or more applications for implementing the processes described in the present disclosure, as well as other processes relating to processes such as information storage and communication. The processes may also be implemented in operating system 220.

Credit report service 224 may include software and instructions for receiving and processing user requests to generate a customized credit report. For example, credit report service 224 may receive a user request to generate a customized credit report, identify a stored credit report associated with the user, identify a stored template associated with a third party provider of the stored credit report, generate the customized credit report based on information obtained from various sources, and transmit the customized credit report to the user for preview. In some embodiments, the processes described in the present disclosure may be performed mostly at the credit report server. In other embodiments, such processes may be performed, either partially or entirely, on a user device. Using a service associated with the credit report server 104 may provide indicia of trustworthiness and reliability to a third party recipient of the customized credit report. If the customized credit report is received directly from the individual requesting that the credit report be created, then the third party recipient may be cautious or uncertain whether the information in the received credit report is accurate.

Credit report server 104 may include different types of servers, for example one or more data servers, application servers, or Internet servers, or any combination thereof. The components of the system may be connected by any form or medium of digital data communication such as a communication network. Examples of communication networks include telephone networks, LAN, WAN, and the Internet.

One or more features or steps of the disclosed embodiments may be implemented using an application programming interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc. One or more APIs may be used for example to enable communications between credit report system 108 and one or more third party credit agencies 110.

Figure 3A:
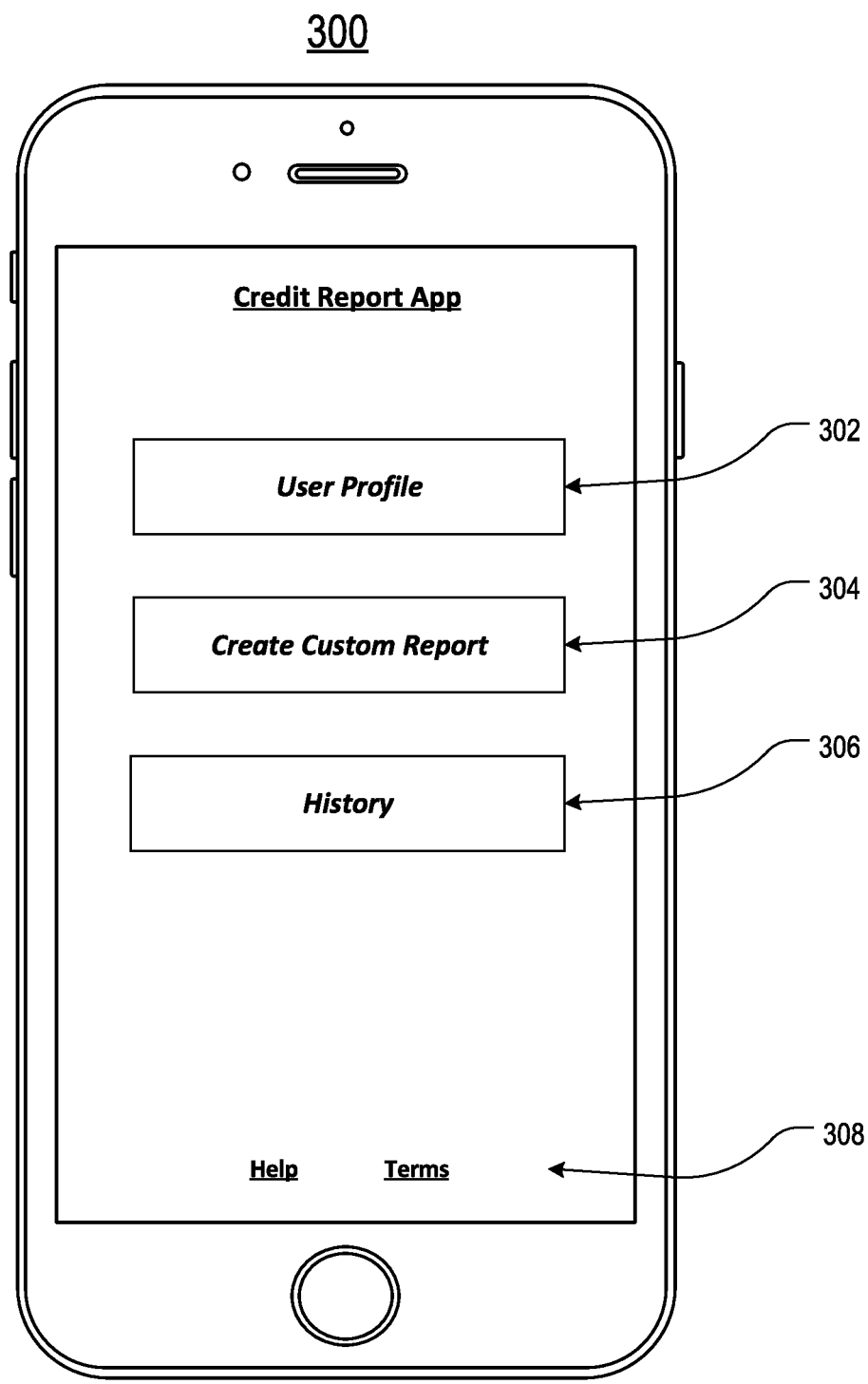
FIG. 3A shows a user interface of an application for obfuscating a credit report according to an embodiment of the present disclosure.
Figure 3B:
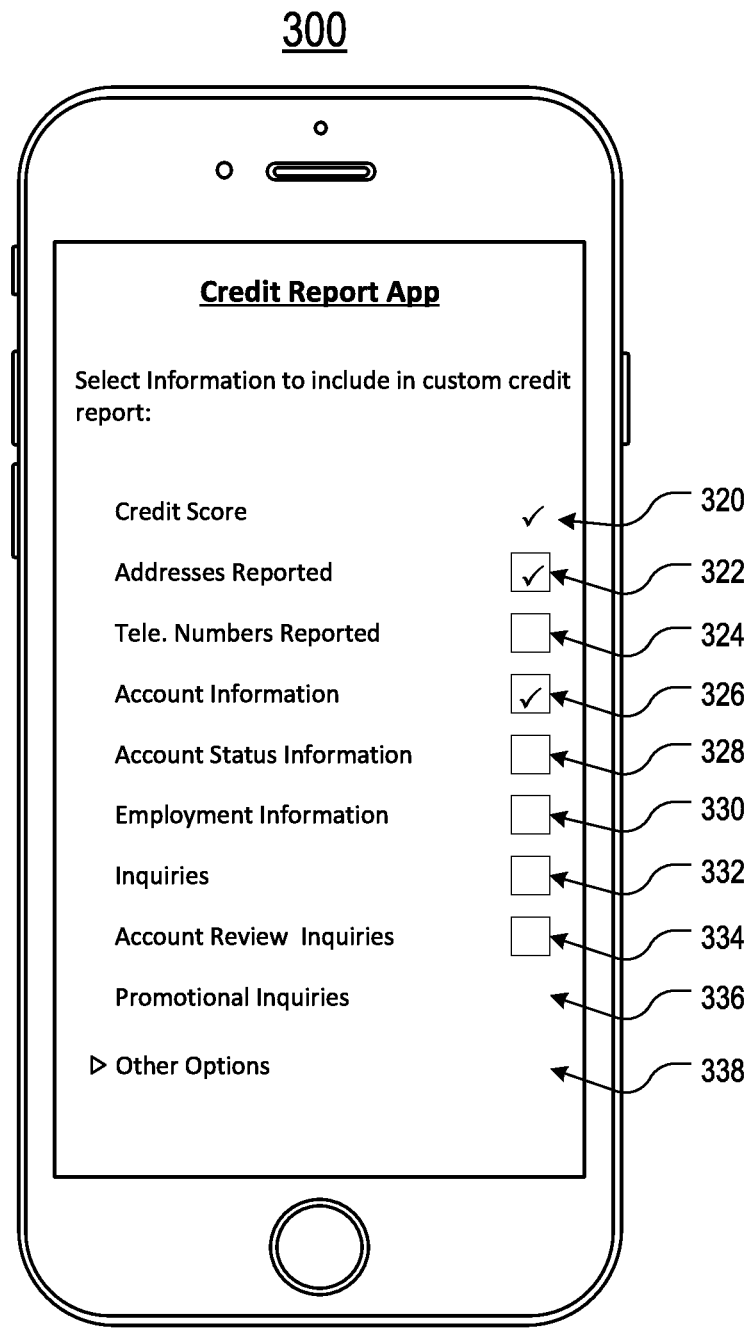
FIG. 3B shows another user interface of an application for obfuscating a credit report according to an embodiment of the present disclosure.
Figure 3C:
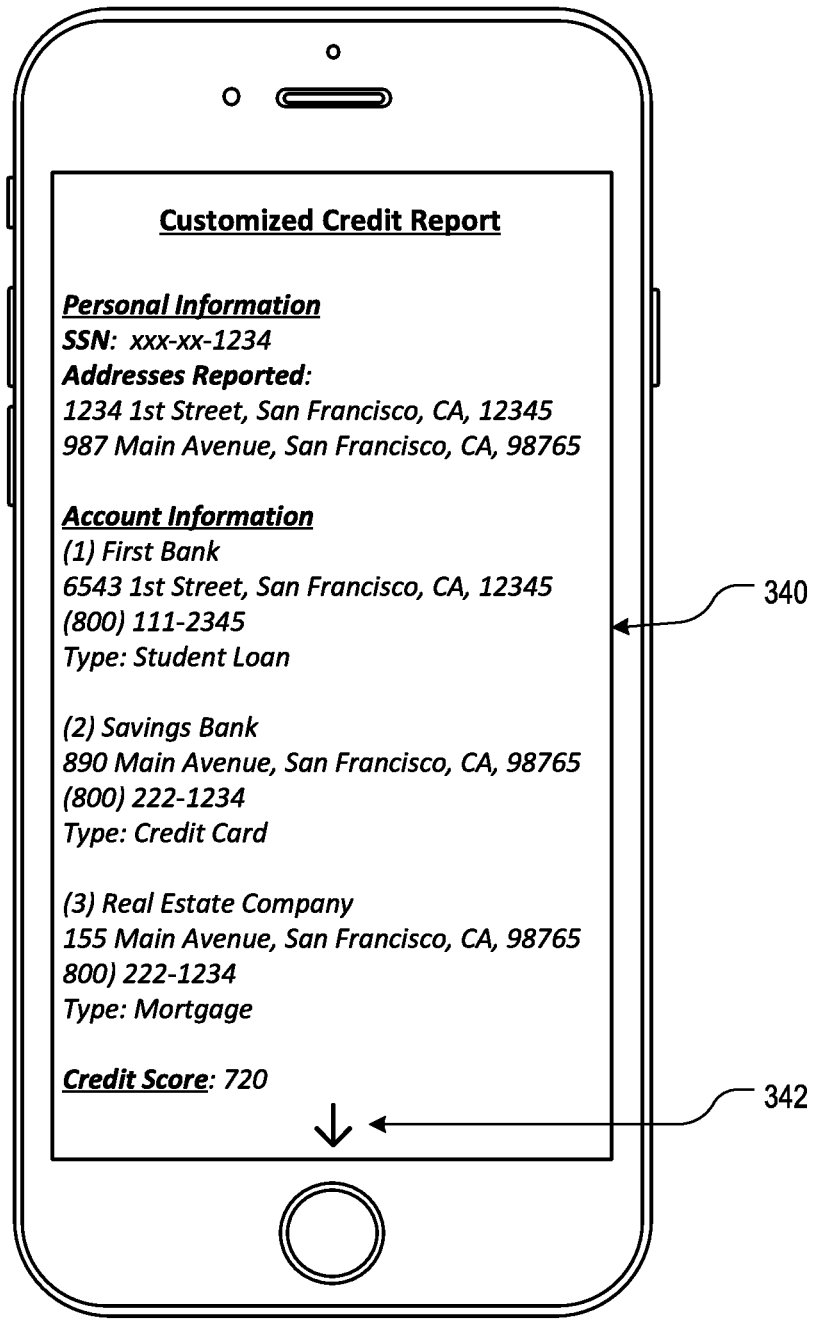
FIG. 3C shows another user interface of an application for obfuscating a credit report according to an embodiment of the present disclosure.
Figure 3D:
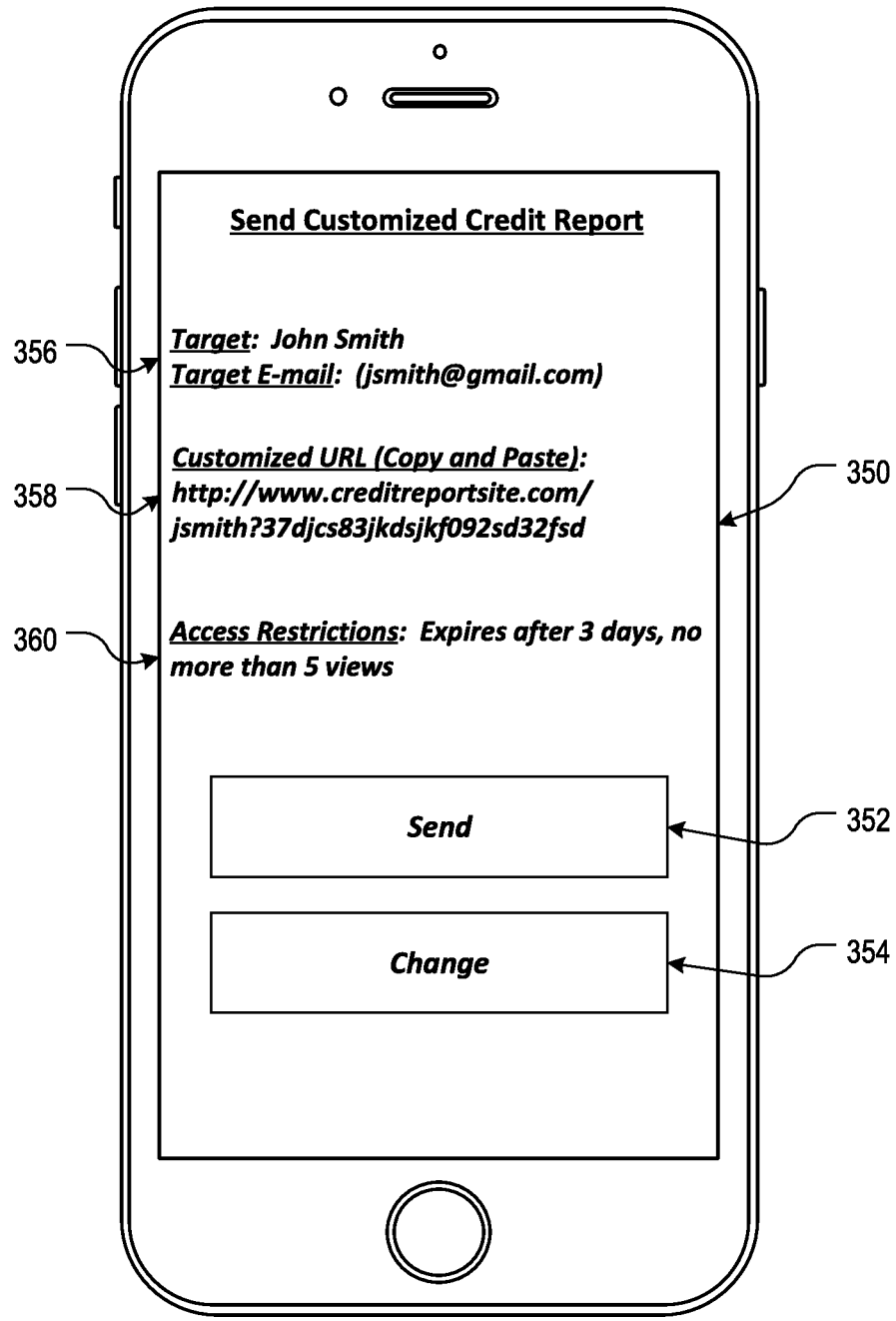
FIG. 3D shows another user interface of an application for obfuscating a credit report according to an embodiment of the present disclosure.

FIGS. 3A through 3D show an application for obfuscating a credit report. The application may be installed and running on a mobile device according to an embodiment of the present disclosure. Generally, FIG. 3A shows a home window, where a user can access a user profile, create a customized credit report, or view their transaction history with the application, FIG. 3B shows a user interface including various options that a user may decide to include, or omit from (or alternatively redact from) a customized credit report, FIG. 3C shows a user interface including a preview of a customized credit report, and FIG. 3D shows a user interface including information relating to the intended recipient of the customized credit report.

FIG. 3A shows a user interface of a user device 300 according to an embodiment of the present disclosure. User device 300 may include user device 102. The user interface shown may be accessed by using an application (app) installed and running on device 300, including a credit report app. In some embodiments, the user interface may be part of a credit report functionality of an application on the user device providing additional functionality (such as a financial services application). The credit report app (or app functionality) may be configured to display a home screen having several soft buttons, including a user profile 302, create custom report 304, and history 306. The user interface may also be configured to display other information 308, such as a "Help" link and a "Terms" link for providing guidance to a user of the app, as well as terms for use of the app.

If a user selects the user profile 302 soft button, a user interface displaying user information may be presented on the display of device 300. Such information may include, for example, a user name, password, contact preferences, security preferences, and options for storing customized credit reports and other credit report information specific to the user. Selecting the history 306 soft button may result in a user interface displaying the user's app history, for example, links to copies of old customized credit reports, recipients of customized credit reports, and other information.

If a user selects the create custom report 304 soft button, device 300 may transmit a customized credit report request to a server, for example credit report server 104. In response, server may transmit information fields for the user of device 300 that the user can select in order to customize a credit report. FIG. 3B is an exemplary user interface in response to a user transmitting a request to a credit report server for creating a customized credit report.

As shown in FIG. 3B, the user interface may include various selectable user interface elements to include (or alternatively omit) from a credit report. In some embodiments, the user may be able to specify the purpose of the customized credit report. For example, the user may specify that the credit report is intended for a rental or lease purpose, for example a potential landlord performing a background check on the user. The user may alternatively specify that the credit report is related to an application for credit, for example to obtain a home mortgage, a car mortgage, or a personal loan. The type of information shown and/or selectable in the interface to include for any customized credit report may vary, depending on the purpose of the credit report.

The selectable user interface elements (or options) may include different types of interface objects. As shown, the user interface includes selectable checkboxes, where a user can interact with a selectable checkbox by touching a location of the touchscreen corresponding to the checkbox. Other embodiments are possible, for example a user entering a "Y" or "N" in a text field, or performing a swiping gesture to add or remove a particular option.

A user may request to include or omit information from a customized credit report. For example, a customized credit report may include various pieces of information, including a credit score 320, addresses reported 322 (e.g., a list of addresses that the user has previously resided), telephone numbers reported 324 (e.g., a list of telephone numbers that the user has previously been associated with), account information 326 (e.g., a list of credit accounts associated with the user), account status information 328 (e.g., a list of statuses of each account associated with the user), employment information 330 (e.g., a list of prior employment associated with the user), inquiries 332 (e.g., a list of hard and/or soft inquiries associated with the user), account review inquiries 334 (e.g., a list of other inquiries associated with the user), and promotional inquiries 336. A customized credit report may also include additional information. In the context of the user interface shown in FIG. 3B, the user may interface with an expander element 338 to show/hide other options that may be included in a customized credit report.

Certain types of information may be required in a credit report. In some embodiments, when certain types of information are required, a user may not be presented with the option of selecting such information. For example, in FIG. 3B, for credit score 320, there is no selectable checkbox, and the checkbox associated with credit score 320 is shown as a "checked" value (i.e., a value representing that the credit score will be included with the customized credit report). For other types of information, such as addresses reported 322, telephone numbers reported 324, account information 326, account status information 328, employment information 330, inquiries 332, and account review inquiries 334, the user may select the checkbox associated with such information, so that if the checkbox is selected, the information associated with that checkbox will be included in a customized credit report, and if the checkbox is not selected, the information associated with that checkbox will not be included in a customized credit report. In some embodiments, a user may not have the option of selecting a checkbox, and the information associated with the unselectable checkbox will default to not be included in the credit report. This is shown in FIG. 3B for promotional inquiries 336, where no checkbox is shown, and no "checked" value is displayed. In some embodiments, the purpose of the credit report may determine whether various fields shown in FIG. 3B are selectable, non-selectable, required, and not required. In this manner, a customized credit report can be modified as necessary to comply with applicable law.

Credit report system 108, including credit report server 104, may be associated with an entity that is not a credit agency, for example a financial services entity. In such embodiments, the credit report system 108 may receive a user's credit report from a third party credit agency 110. As discussed in the present disclosure, the credit report system 108 may generate a customized credit report based on the received credit report from the third party credit agency. In some embodiments, generation of a customized credit report may be based on a template associated with a credit agency. The template may be stored in credit report database 106 or in other storage mediums associated with credit report system 108.

Other embodiments for credit report system 108 are also possible. For example, credit report system 108 may be associated with a credit agency, such that the credit agency directly handles requests for credit reports, customized or obfuscated credit reports, as well as other services typically offered by credit agencies. In some embodiments, third parties may interact with credit report system 108 (managed by a credit agency) via an API, such that third parties may request and receive a customized credit report, such that one or more fields of the report may be omitted or redacted as discussed in the present disclosure. The APIs used to access services provided by credit report system 108 can be private or public (also known as open) APIs, depending on the party seeking access to customized credit report related services. As discussed in the present disclosure, individuals or entities may request creation of a customized credit report or access to an existing customized credit report.

In some embodiments, a request for a credit report to a credit agency may be a partial request, such that the "credit report" returned by the credit agency may be populated in a manner consistent with the request. For example, if a request to the credit agency for a copy of a credit report associated with an individual does not request information regarding inquiries on the individual's credit profile, the returned "credit report" (or partial credit report) may include information typically included with a credit report, except for the information not requested, in this example inquiries, for example soft or hard inquiries, on the individual's credit profile. If a third party entity is associated with the credit report system 108, when for example a third party sends a request for a customized credit report associated with the individual to credit report system 108, the third party may not see an "inquiries" option available to include with the customized credit report. The credit report system 108 may track that inquiry related information was never received from the credit report obtained from the credit agency, or alternatively indicate that it is not a selectable option to include in any customized credit report (because the credit report system 108 does not possess such information).

When the credit report system receives a user's credit report from a third party credit agency, the credit report may be in the form of a document or image or other known format. When the report is received as a document, the credit report system may analyze the credit report to identify structures within the document, text within the document, or a combination of both techniques. For example, the credit report system may analyze whether the credit report is presented in a structured manner, for example sections including addresses reported, account information, account status information, inquiries, and other information often included in a credit report. If the credit report system is able to identify structure data in the credit report, the credit report system may identify those sections selected by a user and copy the content from those sections in order to populate a customized credit report. In such a manner, the credit report system may include or remove sections from a customized credit report based on the user's input. The credit report system may use a stored template in identifying structured data within a credit report, and may similarly use a stored template for identifying text within a credit report.

The credit report system may have special processes and logic when it determines that a credit report varies from a stored template. For example, in determining whether a stored template should be updated, the credit report system may run a program that compares section headers identified in a credit report received from a credit agency with section headers in a stored template. Such a program may include techniques for identifying variations in language, for example if a credit agency modifies a section header to include additional language, or modifies a word in a section header, such that the stored template may be updated to reflect minor changes in the format that the credit agency uses to prepare and send credit reports. Other programs may also be used, for example to detect movement of a section within a credit report, or to identify additions or subtractions from a credit report. In some embodiments, if the credit report system detects that a section that usually is included in a credit report received from a credit agency is removed, the credit report system may send an alert to a system administrator to identify the potential change in format and/or substance of the credit report. In other embodiments, the credit report system may apply changes to the stored template, which may then be used for subsequent requests for customized credit reports.

In other embodiments, the credit report system may perform natural language processing on the contents of the credit report. For example, if the credit report system is unable to identify structured data in the credit report received from the credit agency, for example if a credit agency changes the structure of a credit report or if the report is in the form of an image or similar format type, the credit report system may apply optical character recognition (OCR) techniques to the report (if the credit agency did not already apply OCR techniques), and then perform a natural language analysis on the text-searchable credit report to identify relevant information to be included in the customized credit report. In such a manner, image content may be converted into text that can be associated with information typically included in a credit report.

For example, if a credit report is received as an image, the credit report system may perform an OCR process on the image to convert text portions of the credit report in a form that they can be searched for by a user or a program. If the credit report is received as a text file, no OCR may be needed. Once searchable, the credit report system may include logic for searching and identifying section headers in the received credit report, as discussed in the present disclosure. The credit report system may identify all sections within a received credit report, and flag content within each section that may be redacted based on user input, or in other embodiments content within each section that may be copied into another document, for example if a customized credit report is generated by creating a new document, rather than modifying an existing document.

The credit report system may also apply machine learning techniques for identifying text, patterns, and other information in credit reports that may improve the system's ability to identify relevant information to include or exclude in a customized credit report, including the ability to do so for credit reports received from different credit agencies. Such techniques may be useful for cross-comparison, identifying inconsistencies between credit reports received from different credit agencies, and identify information that is accurate and may be included in the customized credit report. One example of a machine learning technique is to manually tag sections or information in a credit report (either a real credit report or a test or sample credit report), create and run algorithms to identify/classify sections and information in the reports, and further refine such tags and algorithms until the credit report system can identify sections of a credit report, and information contained in the credit report, to a reliable and successful degree.

The credit report system may generate a customized credit report in different ways using natural language processing. For example, the credit report system may OCR a credit report received from a credit agency (or receive a report that contains identifiable text), place the OCR content in a new file, and then perform natural language processing techniques to identify and remove information that the user does not desire to include in the customized credit report. In other embodiments, the credit report system may analyze the credit report, identify information to be included in the customized credit report using natural language processing on a document with OCR techniques previously applied, and create a document where the identified information may be stored and saved as a new credit report.

As an example, a user may decide that account status information should not be included with a customized credit report. When the credit report system analyzes a credit report received from a credit agency, the credit report system may identify structured data correlating to an account status information section and remove that section from the customized credit report (or in some embodiments only identify relevant information to include in the customized credit report, which would similarly exclude account status information). A user may further indicate that certain information may be included (e.g., whether an account is in an open, closed, or other status), and other information is to be omitted or redacted (e.g., a balance of an account).

A customized credit report can be stored in several different ways. For example, a customized credit report can be saved as a text file, as structured data, as an image or PDF file, or other file type. In some embodiments, information may be stored in a database, such that specific information may be individually updated (e.g., an updated credit score) without creating and saving a new customized credit report when the credit report system receives an updated credit report that differs from a credit report previously received by the credit report system. If a customized credit report is stored as a redacted image, the credit report system may include a copy of the original credit report (unredacted) and track redacted changes to the credit report so that the credit report system may readily identify the portions of the credit report and the information that was redacted.

While the above discussion refers to including or removing information to be included in a customized credit report, in some embodiments, information that is identified by a user as not to be included in a credit report may be redacted, such that the third party viewing the customized credit report may not view information identified previously by the user.

The user interface shown in FIG. 3C is an exemplary user interface shown after a user submits information to include in a customized credit report according to an embodiment of the present disclosure. FIG. 3C shows a customized credit report preview 340, which may include various pieces of information typically included in a credit report. For example, a customized credit report preview 340 may include personal information, such as a social security number with portions of the number omitted for security, addresses reported, account information, and a credit score. Depending on the display resolution of device 300, it is possible that not all information may be viewed from a single screen, so a user can navigate through the customized credit report preview 340 using a selectable user interface element 342, or by performing a gesture such as swiping up on the touchscreen of device 300 (e.g., by starting at the bottom of the device and moving the user's finger to the top of the display).

In some embodiments, the user may have the option to further remove information that is not necessary. For example, if the user does not want to disclose any portion of their social security number, the user interface may include a user interface element on the same level as the social security number (i.e., the element is displayed in a manner such that the user can associate the element with the social security information), and the user can select the element, causing the social security number to be removed or not displayed. If information is required to be included with the customized credit report, then the user interface element for removing information displayed in the customized credit report preview 340 may not be present and be selectable for the user.

After reviewing a preview of a customized credit report, a user may determine that the customized credit report is ready to be sent to an intended recipient. FIG. 3D shows a user interface for defining such intended recipients, and for methods and restrictions on delivering the customized credit report and for limiting its accessibility. For example, a user interface may show a send customized credit report interface 350. The send customized credit report interface 350 may include a target, or intended recipient, an e-mail address of the intended recipient, a customized URL, and access restrictions. The user may provide the target and target e-mail through text editable fields, or alternatively the user may select the target through an address app installed and running on device 300. In some embodiments, a user may select a target by a drop-down list, where the list of potential targets may be based on entries in an address book of an address app running on device 300, or a list defined by a user through customized credit report app.

In some embodiments, customized credit report interface 350 may include a custom URL. The custom URL may be a unique identifier (i.e., such that no customized credit report is associated with a URL that is already associated with a different customized credit report), and may include one or more parameters that may be used to identify the customized credit report that should be returned to the user who interacted with the URL. Such parameters may include for example a third party identifier, a customized credit report identifier, and a user identifier, as well as other parameters, including parameters for tracking the source of the URL (e.g., through an e-mail generated by a user, through an app, or through an online service). More than one parameter may be preferred in some embodiments in order to prevent random guessing or brute force techniques that may allow an unauthorized party to access the credit report. The credit report system may generate a unique identifier (UID) for each parameter, for example, to enhance security and prevent the likelihood that information passed as a parameter in a URL may be identified by a non-party.

The customized URL is a URL that may be generated by credit report server 104 that a user may copy and paste, for example, into an e-mail, a message (through for example a messaging app), or through other electronic delivery mechanisms. In other embodiments, the customized URL may not be displayed. For example, if a user sets their profile settings to not use customized URLs for customized credit report delivery, or declines that option for a customized credit report request, then the customized URL may not be generated and may not display in customized credit report interface 350. The user, or alternatively the system, may determine that certain information and features relating to the customized credit report should be tracked or limited. For example, the system may create counters or programming constructs that track the total number of times a credit report link has been accessed (how many times the customized credit report has been viewed), or track a time associated with the first availability of the credit report (so that the customized credit report link is deactivated after a certain period of time, for example a week).

The user may have the option to limit access restrictions to a customized credit report. This may be of particular benefit if a customized URL is generated and made available to a target. In the user interface shown in FIG. 3D, the access restrictions have been set such that the customized URL will expire after three days, and the customized URL is limited to no more than five views. If a user desires to change the target, target e-mail, or access restrictions, the user may select the change 354 button. If a user selects change 354, the user interface may change from a static (i.e., non-editable) user interface to a user interface that the user can modify the target, target e-mail, or access restrictions to settings preferred by the user.

If a user determines that a credit report is ready to send, the user may select the send 352 soft button. After selecting send 352, the credit report app may send a request to credit report server 104 that includes target information and access restrictions. In response to receiving confirmation that the user desires to send the customized credit report, the credit report server 104 may send a copy of the customized credit report to the e-mail address(es) defined in the target e-mail field. A user may choose to send the customized credit report to one or more target e-mail addresses in a single transaction. The customized credit report may be sent as an attachment to an e-mail, or in some embodiments may be included in the content of the e-mail. The e-mail may also contain the customized URL, such that if the recipient of the e-mail selects the URL, the recipient may be directed to a website where the customized credit report is available for viewing by the recipient.

Although the customized URL is shown as a URL that a user may copy and paste into an e-mail, other embodiments not shown are possible. For example, an additional button (not shown) may be added to a user interface that, when selected, causes the customized URL to be automatically sent to the target e-mail address. In this manner, the user does not need to perform further action, such as copy and paste the customized URL in an e-mail using an e-mail client or app, in order to send the customized URL to the intended third party. The user may optionally select a user interface element that automatically performs this step on behalf of the user. Such an embodiment may be preferred, for example, if the third party prefers to receive a customized URL from a third party managing the application and custom report generation. For example, a user may create a modified, or tampered, version of the report, create a custom URL that directs a browser to the modified or tampered version of the report, and send that URL to the third party. When the third party views the credit report available at the URL, the third party may not identify that the URL does not point to a domain associated with the third party managing the application and customized credit report generation process. The third party may prefer that the customized URL comes from a neutral party source, rather than from the individual to whom the third party is attempting to perform a background or credit check.

A customized credit report may also be delivered to an intended recipient through other means. For example, as discussed in the present disclosure, a third party (i.e., a party interested in viewing a user's credit report) may initiate a request for a user's credit report. In some embodiments, the third party may download an app on to a device, or register with an online service, such that the third party may be authenticated prior to sending a request for the user's credit report by providing credentials. If a third party has downloaded an app that provides customized credit reports and registered with the entity that provides the customized credit report service, the third party may initiate the request for a credit report through an app user interface. The third party may input information specific to a user or individual that the third party desires to obtain a credit report for, for example a name and an e-mail address or other identifying information.

If the individual is not registered with the app or the entity that provides the customized credit report service, the system may send a notification to the individual. The notification may include a name of the third party, other information relating to the third party, and a message indicating that the third party is requesting a copy of the user's credit report. As described in the present disclosure, the individual may register with the system, create a customized credit report, and then share the customized credit report with the requesting third party.

After a third party sends a request for a customized credit report associated with a user, and the customized credit report is created, the app (or other logic, for example an online service) may send a notification to the third party that the customized credit report is ready to be viewed by the third party. The notification may include a customized URL that the third party may interact with that directs the third party's browser to a website where the customized credit report may be viewed, for example. The notification may also contain, either in addition to, or alternatively to, the customized URL, the content of the customized credit report, either in the body of the notification or as an attachment. The means through which the customized credit report may vary, and is not limited to the methods expressly described in the present disclosure.

Figure 4:
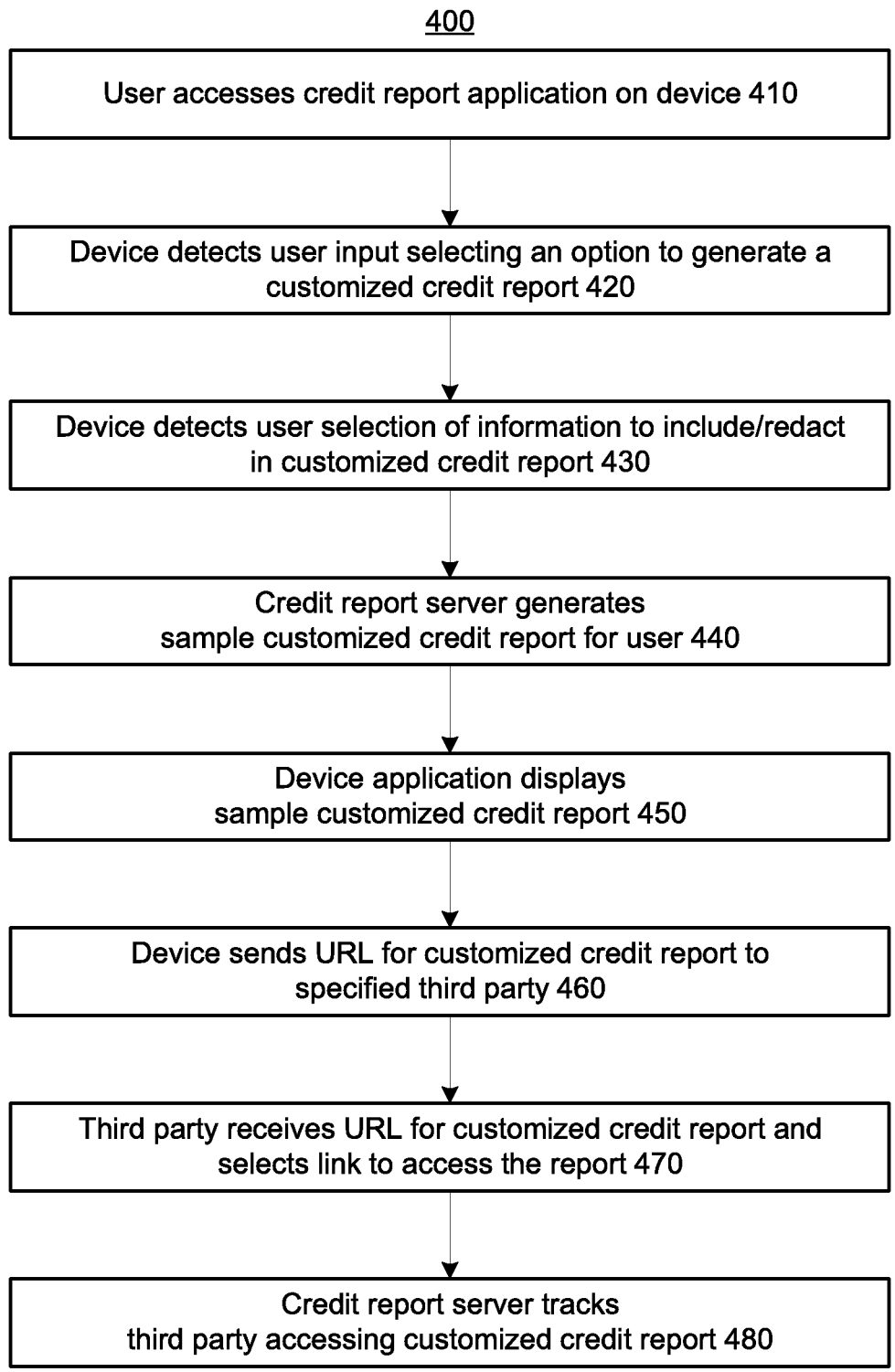
FIG. 4 shows a method for identifying and selecting information to obfuscate in a customized credit report according to an embodiment of the present disclosure.
Figure 5:
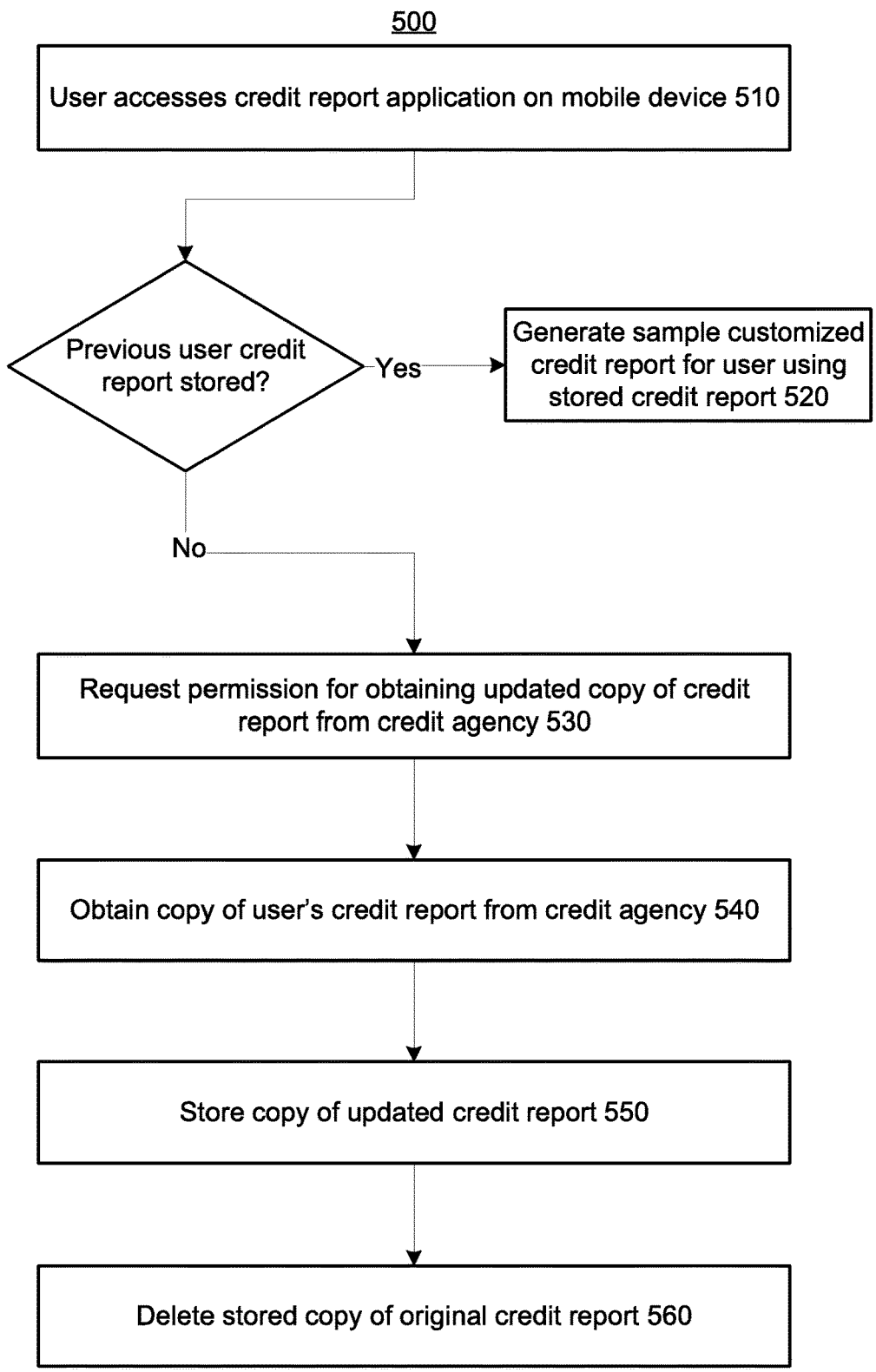
FIG. 5 shows a method for creating customized credit reports using a stored credit report and obtaining a credit report for storing according to an embodiment of the present disclosure.

FIG. 4 shows a method for identifying and selecting information to obfuscate in a customized credit report according to an embodiment of the present disclosure. The process begins at 400 and proceeds to step 410, where a user accesses a credit report app on a mobile device, for example user device 102. In some embodiments, the credit report app may come pre-installed on the mobile device, or the credit report app may be downloaded and installed by the user of the mobile device. As part of setting up the credit card app, the user may create a user profile and establish preferences, including preferences described in the present disclosure. While FIG. 4 and FIG. 5 shows embodiments including a mobile phone, other embodiments are possible. For example, other types of consumer electronics, such as laptop computers, desktop computers, PDAs, tablets, watches, and other devices with a memory and a processor, may be configured to perform the processes shown in FIG. 4 and FIG. 5. A mobile phone is used for exemplary purposes only.

The method proceeds to step 420, where the device detects user input for selecting an option to generate a customized credit report. For example, this step may occur when the device detects a user selection of the create custom report 304 button shown in FIG. 3A. In some embodiments, an intended recipient of a customized credit report may transmit a request to access a credit report associated with the user to a server, for example credit report server 104. The third party intended recipient may create such a request through a website associated with the credit report server 104, or alternatively by the credit report app downloaded onto a device being used by the third party. In either example, the third party may be able to identify the individual to whom a credit report is requested (for example to confirm that the individual is a registered user) and identify information that the third party desires to view. The credit report server 104, after receiving the request from the third party, may transmit a message to the user, for example through a credit report app, that the third party desires to access a credit report associated with the user. The user of the mobile device can then authorize the third party request and confirm information to include, omit, or alternatively redact in the customized credit report.

After transmitting a request to create a customized credit report, the method proceeds to step 430, where the device presents a user interface to display that allows the user of the mobile device to determine which information should populate the customized credit report. The information may be selected for example based on the user interface elements shown in the user interface of FIG. 3B, though other embodiments for identifying information to include in a customized credit report are within the scope of the present disclosure. In some embodiments, as part of step 430, the device detects a user selection indicating which information to redact in the customized credit report. For example, a user may desire to redact personal information, but include header information relating to the redacted information in the customized credit report to provide notice to the intended recipient that information has been omitted from the customized credit report, as well as what type of information has been omitted. In this manner, an intended recipient can further request the omitted information, or proceed to view the report knowing that certain information has been redacted.

Customized credit reports (or original credit reports) that are stored as image files and require sections or information to be redacted may need to be handled differently than a text file. Redaction of such reports may include, but is not limited to, completely blacking out information that the user identifies as not to be included in a customized credit report, for example by adding black marking to an image, or alternatively creating an image of a text file and applying black markings to information to be redacted (the credit report system, prior to preparing an image of the text file, may identify where in the document information to be redacted exists). When a user requests that sections of a credit report be redacted, the credit report system may need to determine the size of the section (or the portions of the document that the section is displayed) for placing a redaction marker to be used to redact the section in the document.

One possible way to do this is to OCR the document, identify the section to redact, the boundaries and size of the section, place a redaction marker over the boundaries, and then re-image the document. The credit report system may then redact the section that the user requested be redacted because the credit report has identified the section through the OCR process, and contains logic for identifying the location of the document where a section or information is to be redacted. As discussed in the present disclosure, stored templates may be used for creating customized credit reports, or for comparing receiving credit reports in order to determine if the credit report contains information that may vary from a typical credit report (such that the credit report system may track changes to the credit report template made by the credit agency). The stored templates may be used to compare an OCR document for purposes of identifying information that should be redacted in an original credit report (e.g., to identify those portions of a credit report that is in an image format). Machine learning techniques may be used to assist in identifying section headers that may be used to flag content that should be redacted or removed from a customized credit report.

Once the sections of a credit report to be redacted are known, the credit report system may then determine the approximate size of the content in each section that may be redacted, depending on whether a user requested that any given section be redacted for a customized credit report. Once an approximate size has been determined, the credit report system may then place a marker or indicator around the content to be redacted. Redaction techniques may then be applied to the document in order to redact the content that is to be omitted or not viewable in the customized credit report, including tracking all redactions that may need to be applied to a credit report, when a user for example requests that more than one section be omitted or redacted from a customized credit report. The sections to be redacted may be identified by a redaction list, for example when a user selects sections to be redacted from a credit report. The credit report system may receive the list of redactions via the user request, and apply redactions pursuant to the user's request.

In step 440, the credit report server generates a sample customized credit report for user. A sample customized credit report may be similar to the customized credit report shown in FIG. 3C. The customized credit report may be accessed through the credit report app running on the mobile device, or in other embodiments, the user may interact with a link embedded in a user interface of the credit report app to access a website via a customized URL to access a preview of the customized credit report. In step 450, the credit report app running on the mobile device displays the sample customized credit report, after the customized credit report (or a link to the customized credit report) is sent to the mobile device. In some embodiments, the user navigates to a website through a custom URL to view the sample customized credit report.

Once the user determines the customized credit report may be sent to an intended recipient, the device detects user input and sends the customized URL for the customized credit report to the intended recipient, or specified third party, at step 460. A user may do this, for example, by copying and pasting the customized URL into an e-mail or messaging service available on the device. In other embodiments, the third party accesses the customized credit report through a credit report server, for example credit report server 104, if the third party receives a notification from the entity maintaining the credit report server that the customized credit report is available to view. A benefit of accessing the customized credit report through the credit report server 104, rather than directly through a link or copy of the customized credit report directly from the user, is that the intended recipient has some assurance that the user has not improperly modified or manipulated the customized credit report. By accessing the customized credit report through a trusted third party, for example the party managing the credit report server, the intended recipient has some assurance that the customized credit report is legitimate. Further, the credit report server may add markings to the customized credit report sent to the intended recipient to add authenticity to the report, or alternatively if the customized credit report is accessed through a website, by accessing a URL associated with the entity managing the credit report server, the intended recipient has some assurance that the copy available through the third party website is legitimate and authentic.

Other methods for delivering the customized credit report to the third party are possible. For example, the user may interact with a user interface element that causes the system to automatically send a message containing the customized credit report to the third party. The message may include the content of the customized credit report in the message itself, as an attachment to the message, or the message may contain a URL that directs a recipient to a copy of the customized credit report. The message may also contain a notification to the recipient that the customized credit report is available for viewing, and in embodiments where a third party has registered with the app or an online service maintained by an entity associated with the customized credit report service, the third party can access the app or online service to view the customized credit report.

At step 470, the intended recipient receives the URL for the customized credit report, and selects the link that directs the intended recipient's device to a website (either through for example a browser or an app installed on the device) where the recipient can access the customized credit report. In other embodiments, the credit report server may send a copy of the customized credit report to the intended recipient, such that the intended recipient does not have to navigate to a website in order to access the customized credit report.

In embodiments where a URL to the customized credit report is sent to the intended recipient, the credit report server proceeds at step 480 to track any activity relating to the customized credit report accessible by the customized URL. In such a manner, the credit report server may track information relating to an individual accessing the customized credit report, including a date and time of the access, an IP address of the device accessing the customized credit report, and to increment a counter that may be used to limit access once the credit report link has been activated after a predetermined amount of times. Additional protection may be added to the customized credit report by, for example, requiring a password that is included in an e-mail containing the credit report link to the customized credit report to the intended recipient.

FIG. 5 shows a method for creating customized credit reports using a stored credit report and obtaining a credit report for storing according to an embodiment of the present disclosure. The process begins at step 500, and proceeds to step 510, when a user accesses the credit report app on a mobile device or via a web interface on a computing device, for example user device 102.

In some embodiments, the user may attempt to access a stored credit report, for example through the history 306 button shown in FIG. 3A. If the credit report server previously received a request to generate a customized credit report, and generated and stored such a report, then the method may proceed to step 520, where the credit report server may generate a sample or preview customized credit report for the user of the mobile device using a stored credit report. Such an embodiment may be useful to prevent any negative information from being included in a credit report, for example when multiple individuals request a user credit report. In some embodiments, the credit report server may create a new sample or preview customized credit report, and use the information in the stored credit report to populate the preview customized credit report. In other embodiments, the credit report server may send a copy of the stored credit report to the user of the mobile device.

If there is no stored customized credit report, for example if the user or a third party has never submitted a request to create such a report, or a stored customized credit report has been deleted due to inactivity or date of the report, or in some embodiments a stored credit report exceeds an age threshold, the method may proceed to step 530, where the credit report server requests user permission from the user of the credit report app. In other embodiments, user credentials may be used by the credit report server to obtain an updated copy of the user's credit report from a credit agency, and in still other embodiments, the credit report server may request that the user transmit a copy of an updated credit report, received from a credit agency, to the mobile device. In such embodiments, the copy of the updated credit report may include watermarks or other security to indicate that the document has not been tampered with, for example by a user attempting to improve information in a credit report.

At step 540, the credit report server may obtain a copy of the user's credit report from a credit agency. Before obtaining a copy of the user's credit report from the credit agency, the app may request permission from the user, for example if a third party has requested a copy of the user's credit report, and user permission is required to request a copy of the user's credit report with the credit agency. Once the credit report server receives a copy of the updated credit report, it may then store the updated credit report in a database, for example credit report database 106 at step 550. In some embodiments, for example where a stored credit report contains corrupted data, or the stored credit report date exceeds an age threshold (for example if the stored credit report was obtained through a request submitted more than six months prior), the credit report server may delete a stored copy of the credit report. Further, the credit report server may delete any copies of the credit report obtained from the credit agency at step 560, in part to ensure that unnecessary copies of the original credit report are not stored and saved by the customized credit report system. In some embodiments, the credit report server may use credentials provided by a user to obtain a copy of the user's credit report from a credit agency.

Figure 6:
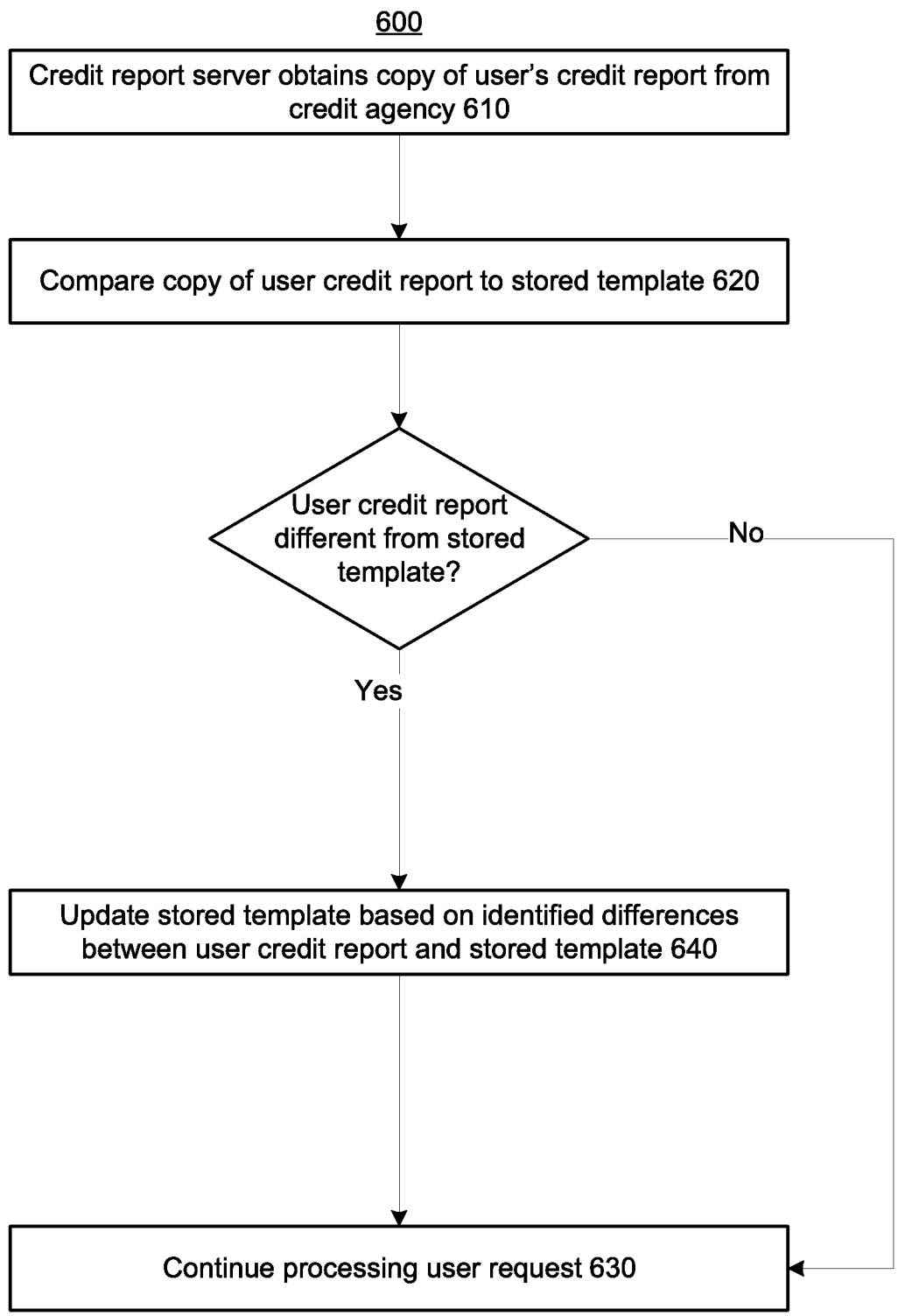
FIG. 6 shows a method for updating a stored credit report template according to an embodiment of the present disclosure.

FIG. 6 shows a method for updating a stored credit report template according to an embodiment of the present disclosure. The process begins at step 600, and proceeds to step 610, where a credit report server obtains a copy of a user's credit report from a credit agency, for example when a user has given permission to obtain a copy of the user's credit report. Once the credit report server obtains a copy of the user's current credit report, credit report server may compare a copy of the credit report to a stored template. The stored template may be a document containing a format for a customized credit report based on a known format associated with credit reports created by a credit agency. The stored templates may be used as a basis to create a custom credit report, using information from an original credit report and a copy of the stored template in order to generate a customized credit report.

The credit report server may compare the user's current credit report (obtained at step 610) to the stored template in order to identify any changes that the credit agency may have applied to its credit reports. If a change is detected, for example the credit report server identifies a new field in the current credit report that is not in the stored template, the process proceeds to step 640, where the stored template is updated based on differences identified between the current credit report and the stored template. If no such differences are identified, the process instead proceeds to step 630, where processing of a user request continues. In this manner, the credit report server may be configured to create a customized credit report that uses a style or template similar to that used by a credit agency that created the original credit report.

The credit report system may also use different templates for a customized credit report associated with a credit report received from a single credit agency. For example, when a requesting party or individual registers with the credit report system through an app or an online service, the individual may specify a preferred order in which information (or sections) are to be presented in a customized credit report. When the credit report system creates a customized credit report based on a request from that individual (or where a user indicates that a customized credit report is to be sent to the registered individual), the credit report system may dynamically, or using a template based on the individual's preferences, create the customized credit report. Style settings (e.g., a font, font size, color scheme) may also be modified, either based on the credit report systems templates, or for example based on a registered individual's profile.

In some instances, the credit report obtained from a third party may contain stale information, for example when a credit report receipt date is more than a predefined time, for example one month, three months, or six months. In some embodiments, when a user selects an option to generate a customized credit report, for example at step 420 of FIG. 4, the system may determine that a stored credit report, obtained from a third party such as a credit agency, is too old, such that it contains information that is considered stale. The system may prevent the user from generating a customized credit report until the credit report is updated, for example by sending a new request for a copy of a user's credit report. After an updated report has been obtained, the system may delete the previously stored credit report, or may mark the previously stored credit report as out-of-date.

While various embodiments have been described above, it should be understood that they have been presented by way of example and not limitation. Various changes in form and detail can be made therein without departing from the spirit and scope. For example, other steps may be provided or steps may be eliminated from the described flows, and other components may be added to or removed from the described systems. As another example, while the disclosed embodiments may discuss sharing customized credit reports with a third party, the methods and systems disclosed in the present disclosure are not limited to credit reports, and may include other documents that can be shared with a third party. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

What is claimed is:

1. A user device for configuring a customized and redacted credit report, the user device comprising:
   a processor;
   a display in communication with the processor;
   a wireless transceiver in communication with the processor; and
   a non-transitory memory storing instructions as part of a credit report functionality of an application on the user device that, when executed by the processor, cause the processor to perform processing comprising:
   transmit a first user request to generate a customized credit report, the first user request comprising a least a user identifier associated with a user profile of a user of the user device;
   display, on the display of the user device, one or more information fields and one or more selectable user interface elements, the one or more selectable user interface elements associated with the one or more information fields;
   transmit a credit report redaction list, the credit report redaction list comprising one or more of the one or more information fields to be redacted based on a selection of the one or more user interface elements;
   receive a shareable credit report link associated with a customized credit report, the customized credit report comprising one or more redacted information fields, the one or more redacted information fields redacted based on the credit report redaction list;
   transmit a second user request to limit access to the customized credit report link to a defined number of views,
   wherein access to the customized credit report is limited based on the defined number of views;
   display a selectable shareable link option;
   select the selectable shareable link option; and
   transmit a user share request, the user share request comprising at least the user identifier and a third party address,
   wherein the user share request is transmitted based on selecting the shareable link option.

2. The device of claim 1, wherein the processing further comprises:
   transmit an additional user request to generate an additional customized credit report, the additional user request comprising at least the user identifier; and
   receive an expiration notice, the expiration notice comprising a message indicating the shareable credit report link has expired.

3. The device of claim 1, wherein the processing further comprises:
   transmit an additional user request to generate a new customized credit report, the additional user request comprising at least the user identifier;
   display, on the display, one or more additional information fields and one or more additional selectable user interface elements, the one or more additional information fields and one or more additional selectable user interface elements based on the contents of the stored credit report;
   transmit an additional credit report redaction list, the additional credit report redaction list comprising one or more of the one or more additional information fields to be redacted; and
   receive an additional customized credit report and an additional credit report link, the additional customized credit report comprising one or more additional redacted information fields, the one or more additional redacted information fields redacted based on the additional credit report redaction list.

4. The device of claim 1, wherein the processing further comprises:
   display the selectable shareable link option and a mail link option;
   receive a selection indication, the selection indication indicating the selection of the mail link option; and pre-populate a message, the message comprising at least the shareable credit report link, the defined number of views and the third party address.

5. A method for creating a customized and redacted credit report comprising:
    logging into a credit report application on a user device, the credit report application associated with a user profile;
    transmitting, by the user device, a first user request to generate a customized credit report, the first user request comprising at least a user identifier associated with the user profile of a user of the user device;
    receiving, by the user device, a copy of a stored credit report, the stored credit report associated with the user profile;
    analyzing the copy of the stored credit report, the analyzing further comprising identifying one or more information fields comprising information associated with the user profile;
    displaying, by the user device, one or more information fields and one or more selectable user interface elements, the one or more selectable user interface elements associated with the one or more information fields;
    transmitting, by the user device, a credit report redaction list, the credit report redaction list comprising one or more of the one or more information fields to be redacted based on a selection of the one or more user interface elements;
    receiving, by the user device, a shareable credit report link associated with a customized credit report, the customized credit report comprising one or more redacted information fields, the one or more redacted information fields redacted based on the credit report redaction list;
    transmitting, by the user device, a second user request to limit access to the customized credit report link to a defined number of views;
    wherein access to the customized credit report is limited based on the defined number of views;
    displaying, by the user device, a selectable shareable link option;
    receiving selection, by the user device, of the selectable shareable link option; and
    transmitting, by the user device, a user share request, the user share request comprising at least the user identifier and a third party address,
    wherein the user share request is transmitted based on receiving the selection of the shareable link option.

6. The method of claim 5, further comprising:
    transmitting, by the user device, an additional user request to generate an additional customized credit report, the additional user request comprising at least the user identifier; and
    receiving, by the user device, an expiration notice, the expiration notice comprising a message indicating that the copy of the stored credit report has expired.

7. The method of claim 6, further comprising:
    transmitting, by the user device, an additional user request to generate an additional customized credit report, the additional user request comprising at least the user identifier;
    receiving, by the user device, an additional copy of a stored credit report, the additional stored credit report associated with the user profile;
    displaying, by the user device, one or more additional information fields and one or more additional selectable user interface elements;
    transmitting, by the user device, an additional credit report redaction list, the additional credit report redaction list comprising one or more of the one or more additional information fields to be redacted; and
    receiving, by the user device, an additional customized credit report, the additional customized credit report comprising one or more additional redacted information fields, the one or more additional redacted information fields redacted based on the additional credit report redaction list, and the additional customized credit report being accessible via an additional sharable credit report link for enabling third party access to the additional customized credit report.

8. The method of claim 5, further comprising:
    displaying, by the user device, the selectable shareable link option and a mail link option;
    receiving a selection of the mail link option; and
    pre-populating, by the user device, a message, the message comprising at least the shareable credit report link, the defined number of views and the third party address.

9. A method for creating a customized and redacted credit report comprising:
    receiving, by a credit report server, a first user request to generate a customized credit report, the first user request comprising at least a user identifier;
    identifying a user profile based on the user identifier;
    accessing a credit report associated with the user profile;
    transmitting, by the credit report server, the credit report to a user device associated with the user identifier, the credit report comprising one or more information fields and one or more selectable user interface elements associated with the one or more information fields;
    receiving, by the credit report server, a credit report redaction list, the credit report redaction list comprising one or more information fields to be redacted based on a user selection of the one or more user interface elements made via the user device;
    identifying, by the credit report server, one or more of the one or more information fields to redact based on the credit report redaction list and machine-learning techniques for identifying additional information to redact from the one or more information fields;
    generating the customized credit report, the customized credit report comprising one or more information fields that are visible and one or more redacted information fields, the one or more redacted information fields based on identifying the one or more of the one or more information fields to redact;
    storing the customized credit report;
    generating a customized credit report link, the customized credit report link associated with the customized credit report, the credit report link comprising one or more parameters, wherein at least one of the one or more parameters is associated with the user profile;
    transmitting by the credit report server, the customized credit report and the customized credit report link to the user device;
    transmitting, by the user device, a second user request to limit access to the customized credit report link to a defined number of views;
    wherein access to the customized credit report link is limited based on the defined number of views;

receiving, by the credit report server, a user share request, the user share request comprising at least the user identifier and a third party address;

generating a third party message, the third party message comprising the customized credit report link, the defined number of views and the third party address; and transmitting the third party message to a third party, the third party associated with the third party address.

10. The method of claim 9, further comprising:

in response to transmitting the third party message to the third party, receiving an open indication indicating the third party has viewed the third party message, and send a read notice to the user device indicating that the third party has viewed the third party message.

11. The method of claim 9, further comprising:

receiving, by the credit report server, an additional user request to generate a customized credit report, the user request comprising at least the user identifier;

identifying the user profile based on the user identifier; and comparing a creation date of the accessed credit report to a credit report time threshold.

12. The method of claim 11, further comprising, based on comparing the accessed credit report creation date and the credit report time threshold, transmitting an expiration notice to the user, the expiration notice comprising a message indicating that the accessed credit report has expired.

13. The method of claim 11, further comprising:

based on comparing the accessed credit report creation date and the credit report time threshold, receiving an updated credit report, the updated credit report associated with the user profile;

transmitting, by the credit report server, the updated credit report to the user, the updated credit report comprising the one or more information fields;

receiving, by the credit report server, an additional credit report redaction list, the additional credit report redaction list comprising one or more additional information fields to be redacted;

generating an additional customized credit report, the additional customized credit report comprising one or more additional redacted information fields, the additional customized credit report based on the additional credit report redaction list and the updated credit report;

storing the additional customized credit report;

generating an additional customized credit report link, the additional customized credit report link associated with the additional customized credit report; and transmitting, by the credit report server, the additional customized credit report and the additional customized credit report link to the user device.

14. The method of claim 9, further comprising transmitting, by the credit report server, an updated credit report request to a credit agency, the updated credit report request comprising user information, the user information associated with the user profile.

15. The method of claim 14, further comprising:

receiving, by the credit report server, a current credit report associated with the user; and storing the current credit report.

16. The method of claim 15, further comprising:

comparing, by the credit report server, the stored current credit report with a stored credit report template, the stored credit report template associated with the credit agency; and updating the stored credit report template based on comparing the stored current credit report to the stored credit report template.

17. The method of claim 16, wherein the stored credit report template is updated based on comparing the stored current credit report to the stored credit report template using a machine-learning technique to identify credit report information from the stored current credit report, and wherein the stored credit report template is based on the identified credit report information.

18. The user device of claim 1, wherein the defined number of views is determined by user input.

19. The user device of claim 1, wherein the defined number of views is automatically determined by the user device.

* * * * *